(12) United States Patent
Cappello et al.

(10) Patent No.: US 11,331,805 B2
(45) Date of Patent: May 17, 2022

(54) MOTION RESTRICTION SYSTEM AND METHOD

(71) Applicant: Sony Interactive Entertainment Inc., Tokyo (JP)

(72) Inventors: Fabio Cappello, London (GB); Jason Gordon Doig, London (GB); Michael Eder, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 310 days.

(21) Appl. No.: 16/442,959

(22) Filed: Jun. 17, 2019

(65) Prior Publication Data

US 2020/0001461 A1 Jan. 2, 2020

(30) Foreign Application Priority Data

Jun. 29, 2018 (GB) ...................................... 1810703

(51) Int. Cl.
*B25J 9/16* (2006.01)
*B25J 9/00* (2006.01)
*A63F 13/25* (2014.01)
*A63F 13/90* (2014.01)

(52) U.S. Cl.
CPC ............. *B25J 9/1679* (2013.01); *A63F 13/25* (2014.09); *A63F 13/90* (2014.09); *B25J 9/0003* (2013.01); *B25J 9/1674* (2013.01); *A63F 2300/8082* (2013.01); *B25J 9/1697* (2013.01)

(58) Field of Classification Search
CPC .................. B25J 9/16; B25J 9/00; A63F 13/25
See application file for complete search history.

(56) References Cited

U.S. PATENT DOCUMENTS

| | | | |
|---|---|---|---|
| 6,152,854 A | 11/2000 | Carmein | |
| 2011/0295399 A1* | 12/2011 | Plociennik | B25J 9/1676 |
| | | | 700/97 |
| 2012/0095575 A1 | 4/2012 | Meinherz | |
| 2012/0290132 A1* | 11/2012 | Kokubo | B25J 9/1666 |
| | | | 700/255 |
| 2015/0352719 A1* | 12/2015 | Nakazato | B25J 9/1674 |
| | | | 700/253 |
| 2016/0054837 A1 | 2/2016 | Stafford | |
| 2016/0349835 A1 | 12/2016 | Shapira | |
| 2017/0225336 A1* | 8/2017 | Deyle | G08B 13/196 |

(Continued)

FOREIGN PATENT DOCUMENTS

WO 2016191050 A1 12/2016

OTHER PUBLICATIONS

Communication pursuant to Article 94(3)for corresponding EP Application No. 19177489.2, 7 pages, dated Sep. 23, 2020.

(Continued)

*Primary Examiner* — Kira Nguyen
(74) *Attorney, Agent, or Firm* — Matthew B. Dernier, Esq.

(57) ABSTRACT

A system for restricting user motion using a robot includes a robot comprising one or more barrier elements, a processing unit operable to identify one or more boundaries in a real environment and/or a virtual environment, the boundaries corresponding to a predetermined extent of allowed motion in that environment, and a control unit operable to control the robot such that at least one barrier element is arranged at a position corresponding to one of the identified boundaries.

14 Claims, 8 Drawing Sheets

(56) References Cited

U.S. PATENT DOCUMENTS

2018/0039330 A1    2/2018  Delaney
2018/0157317 A1    6/2018  Richter

OTHER PUBLICATIONS

Extended European Search Report for corresponding EP Application No. 19177489.2, 7 pages, dated Dec. 2, 2019.
Search and Examination report for corresponding GB Application No. 1810703.7, 5 pages, dated Jan. 10, 2019.
Leif Johnson, Jul. 24, 2016, "Watch How a $25,000 Robot Makes Virtual Reality Way Better", Motherboard, [online], Available from: https ://motherboard. vice.com/ en_us/article/z4 3 yp4NR-robot-feedback, 3 pages, dated Jul. 24, 2016.
Vonach et al., "2017 IEEE Virtual Reality (VR)", published in 2017, IEEE, , "VRRobot: Robot actuated props in an infinite virtual environment", pp. 74-83, Mar. 18-22, 2017.
Examination Report for corresponding GB Application No. 1810703.7, 2 pages, dated Aug. 3, 2021.

* cited by examiner

MOTION RESTRICTION SYSTEM AND METHOD

BACKGROUND

This disclosure relates to a motion restriction system and method.

With increasing processing power and advances in display technology, virtual reality (VR) experiences have become more commonplace. This is driven by both the increase in the level of immersiveness that may be provided (which is important for ensuring a high-quality experience for the user) and the decrease in cost of hardware and content. This has led to an increased consumer demand and a drive to provide high-quality VR experiences to users.

The immersiveness of VR content may generally be improved in two ways—either by improving the software/content that is provided to the user (for example, in the form of better graphics or enhanced interactions) or by improving the hardware used to deliver the experience or enable a user to interact with the content. Examples of these include improved head-mountable display units (HMDs) or peripherals that enable an improved interaction experience for a user.

One particular problem that may arise when engaging in VR experiences is that of a user exploring a virtual environment with boundaries that do not match those in the real environment. This may often be only a minor problem in that a user's sense of immersion may be compromised when they reach for an object that is not present in the real environment, as the expected contact is never made with the object (or its real-world equivalent). However, in some cases this may be significantly more impactful. For example, if a user attempts to sit on a virtual seat, they may end up falling if there is no corresponding real-world object; conversely, it is possible that a user may trip over a real-world object if there is no similarly-located virtual object in the virtual environment.

Existing methods of addressing these problems have been provided that are based upon modification of one or both of the hardware or software.

For example, augmented reality (AR) devices may be utilised that enable a user to see the surrounding environment with virtual content (for example, video game content) being overlaid upon the user's view. This may be achieved using a see-through display, such as a glasses-type arrangement, with a projector or the like to generate images for display on the lenses. Imagery may be generated that enhances the environment (for example, placing virtual objects on real surfaces), or attempts to replace it (for example, applying a 'skin' to an object so as to cause its appearance to change).

While this may be considered advantageous in that the user is able to see real-world objects and tailor their actions accordingly, such arrangements may be rather limiting in terms of the quality of the experience that is provided relative to the immersion and range of experiences offered by a full-immersion VR arrangement.

In a number of VR arrangements, it is possible to define a 'safe play' space that is free of obstacles. For example, a user may use a controller to trace the outline of such an area, or a camera may be operable to capture images of the environment that can be used to identify such a space. As a user approaches the boundary of this area, they may be warned of that fact using visual or audio cues. For example, a mesh may be provided in the virtual environment that corresponds to the location of the safe play space boundary, or an audible warning may be provided to the user when they approach a threshold distance from the boundary.

A problem with arrangements such as these is that a sense of immersion may be lost even if the user does not cross the boundary—the use of graphics and/or sounds that are unrelated to the virtual environment are clear reminders to a user that they are using a VR arrangement rather than actually experiencing the content. The fact that these warnings are provided before there is an issue with the user's location increases the frequency of breaks in immersion for a user, which is clearly undesirable.

SUMMARY

It is in the context of the above problems that the present invention arises.

This disclosure is defined by the appended claims.

Further respective aspects and features of the disclosure are defined in the appended claims.

BRIEF DESCRIPTION OF THE DRAWING

Embodiments of the present invention will now be described by way of example with reference to the accompanying drawings, in which.

DETAILED DESCRIPTION

A robot platform 100 for implementing embodiments of the present invention may take the form of any suitable robotic device, or simulation of a robotic device, as applicable.

The robot platform may have any suitable physical features. Hence movement, where required, may be achieved by wheels, tracks, articulated limbs, internal mass displacement or any other suitable means. Manipulation, where required, maybe achieved by one or more of a mechanical hand, pincer or any other hooking or gripping system, such as a suction or electromagnetic attachment mechanism or a hook or clip, and any further optional articulation such as one or more jointed arms. Vision, where required, may be achieved by optical camera and/or infra-red camera/detector, mounted on the robot and/or located within the environment navigated by the robot. Other situational awareness systems such as ultrasound echolocation, or detection of metal tracks and/or electrically charged tracks, and proximity systems such as whiskers coupled to sensors, or pressure pads, may also be considered. Control of the robot may be provided by running suitable software instructions on a processor of the robot and/or a processor of a remote computer communicating with the robot, for example via a wireless protocol.

Figure 1:
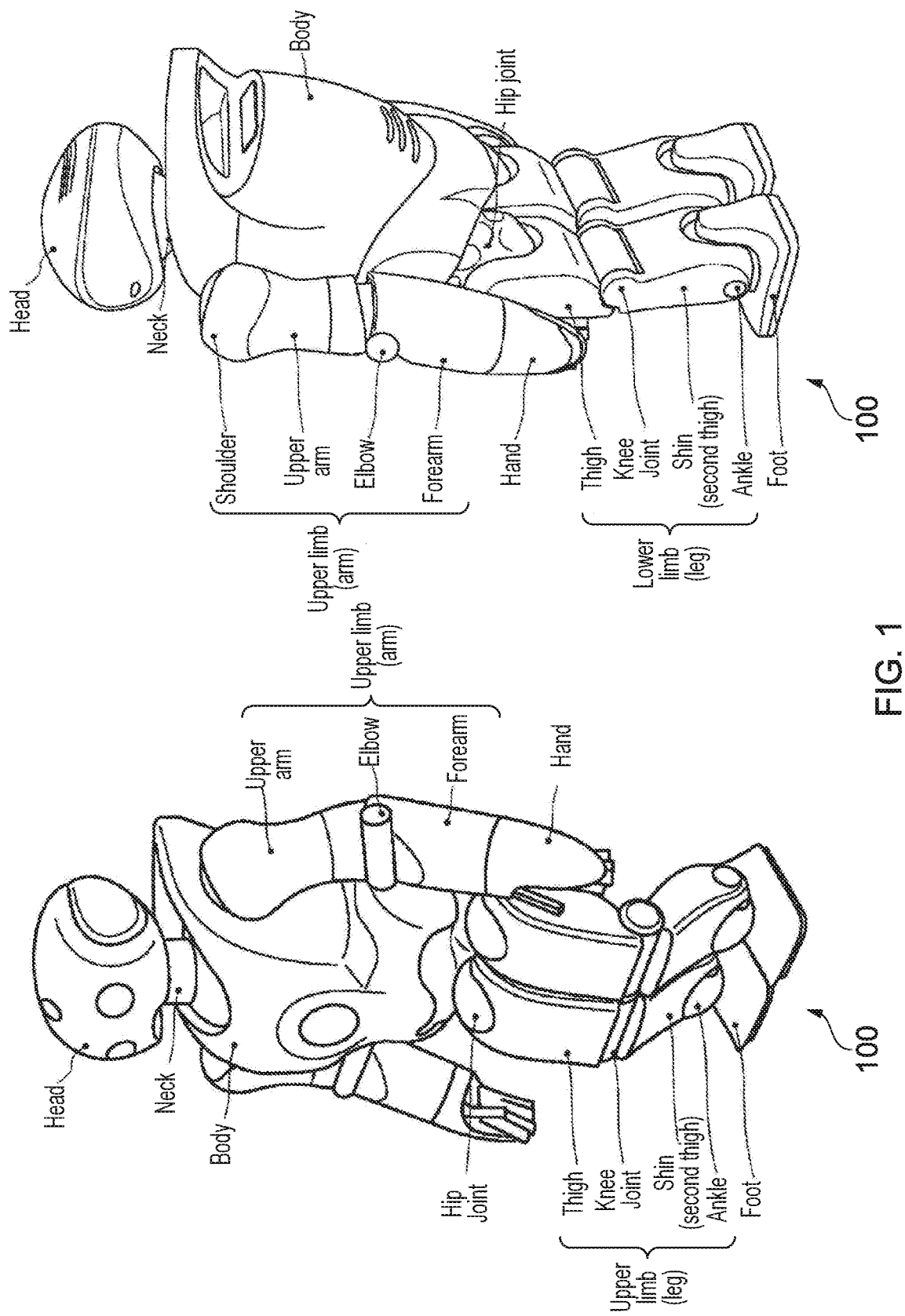
FIG. 1 is a schematic diagram showing front and rear elevations of a robot, in accordance with embodiments of the present invention.

FIG. 1 illustrates front and rear views of an exemplary legged locomotive robot platform 100. As shown, the robot includes a body, head, right and left upper limbs, and right and left lower limbs for legged movement. A control unit 80 (not shown in FIG. 1) within the body provides a control system for the robot.

Each of the right and left lower limbs includes a thigh, knee joint, second thigh (calf/shin), ankle and foot. The lower limb is coupled by a hip joint to the bottom of the trunk. Each of the right and left upper limb includes an upper arm, elbow joint and forearm. The upper limb is coupled by a shoulder joint to each upper edge of the trunk. Meanwhile, the head is coupled by a neck joint near to the upper end centre of the trunk.

Figure 2:
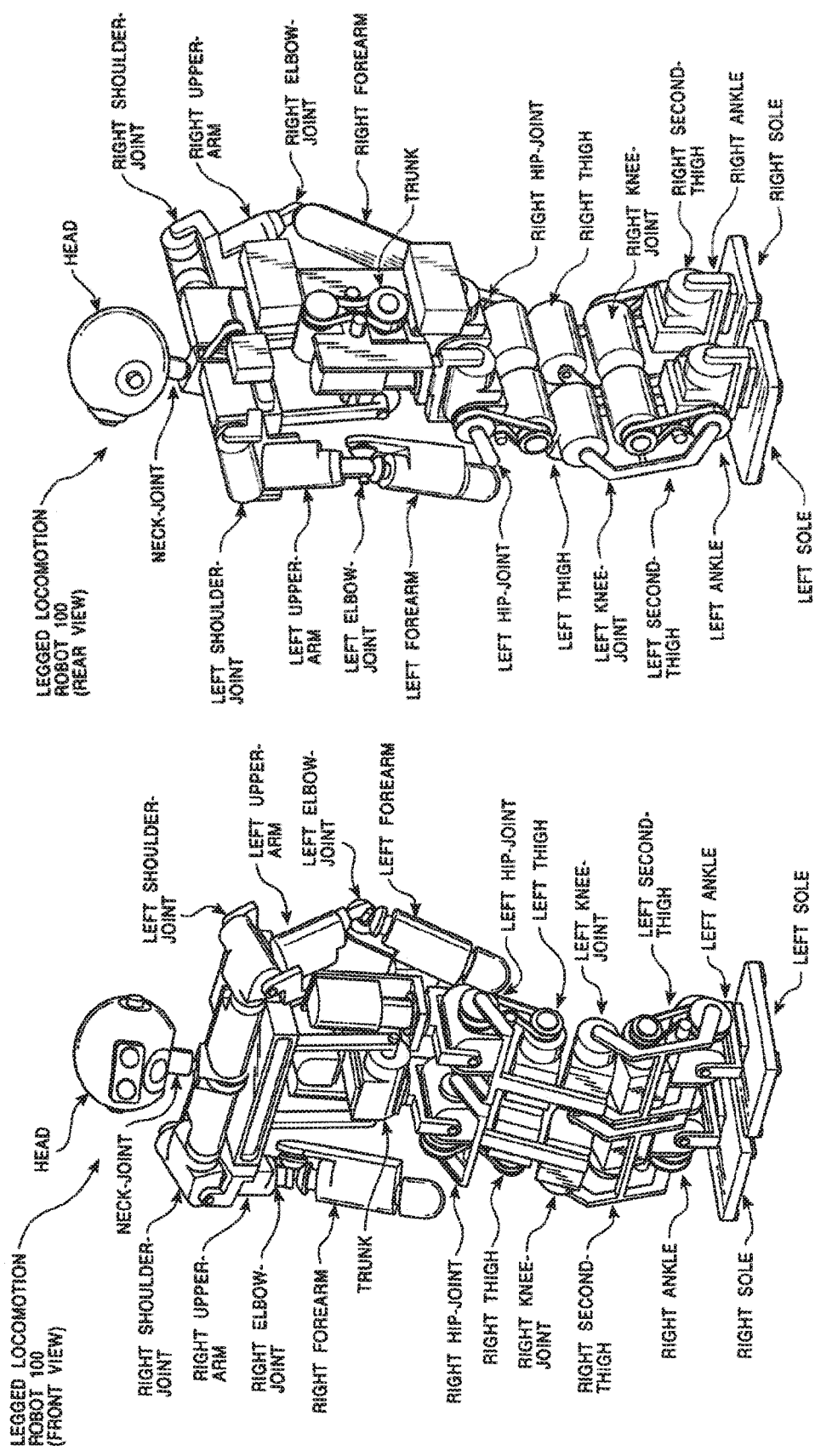
FIG. 2 is a schematic diagram showing front and rear elevations of points of articulation of a robot, in accordance with embodiments of the present invention.

FIG. 2 illustrates front and rear views of the robot, showing its points of articulation (other than the hands).

Figure 3:
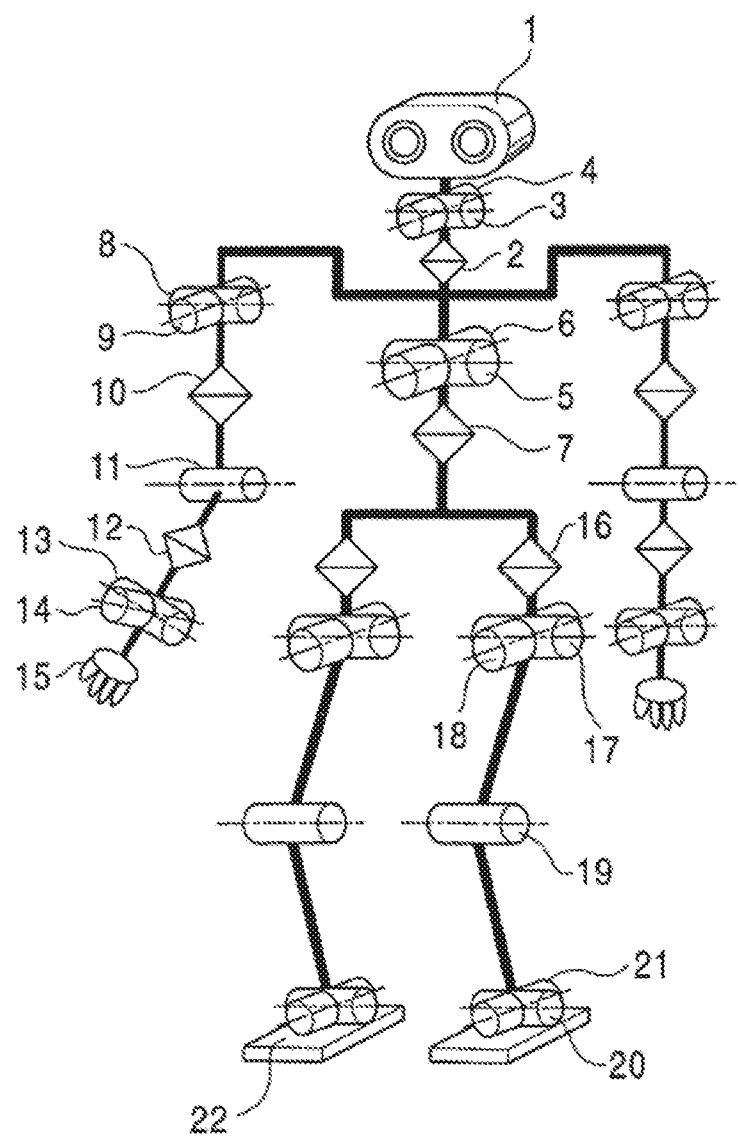
FIG. 3 is a schematic diagram illustrating degrees of freedom at respective points of articulation of a robot, in accordance with embodiments of the present invention.

FIG. 3 then illustrates the degrees of freedom available for each point of articulation.

Referring to these Figures, a neck joint for supporting the head 1 has 3 degrees of freedom: a neck-joint yaw-axis 2, a neck-joint pitch-axis 3, and a neck-joint roll-axis 4. Meanwhile each arm has 7 degrees of freedom; a shoulder-joint pitch-axis 8, a shoulder-joint roll-axis 9, an upper-arm yaw-axis 10, an elbow-joint pitch-axis 11, a forearm yaw-axis 12, a wrist-joint pitch-axis 13, a wrist-joint roll-axis 14, and a hand 15. Typically the hand 15 also has a multi-joints multi-degrees-of-freedom structure including a plurality of fingers. However, these are omitted for simplicity of explanation. The trunk has 3 degrees of freedom; a trunk pitch-axis 5, a trunk roll-axis 6, and a trunk yaw-axis 7. Each leg constituting the lower limbs has 6 degrees of freedom; a hip-joint yaw-axis 16, a hip-joint pitch-axis 17, a hip-joint roll-axis 18, a knee-joint pitch-axis 19, an ankle-joint pitch-axis 20, an ankle-joint roll-axis 21, and a foot 22. In the exemplary robot platform, the cross point between the hip-joint pitch-axis 17 and the hip-joint roll-axis 18 defines a hip-joint location of the legged walking robot 100 according to the embodiment. Again for simplicity it is assumed that the foot itself has no degrees of freedom, but of course this is non-limiting. As a result the exemplary robot 100 has 32 (=3+7×2+3+6×2) degrees of freedom in total. It will be appreciated however that this is merely exemplary, and other robot platforms may have more or fewer degrees of freedom.

Each degree of freedom of the exemplary legged locomotive robot platform 100 is implemented by using an actuator. For example, a small AC servo actuator that is directly coupled to a gear and that houses a one-chip servo-system may be used, although any suitable actuator may be considered, such as a linear servo, electroactive polymer muscle, pneumatic, piezoelectric, or the like.

It will be appreciated that any desired action that the robot platform is capable of may be implemented by control signals issued by a control system to one or more of the actuators of the robot (or to simulated actuators in a simulation, as applicable), to adjust the pose of the robot within its available degrees of freedom.

Figure 4:
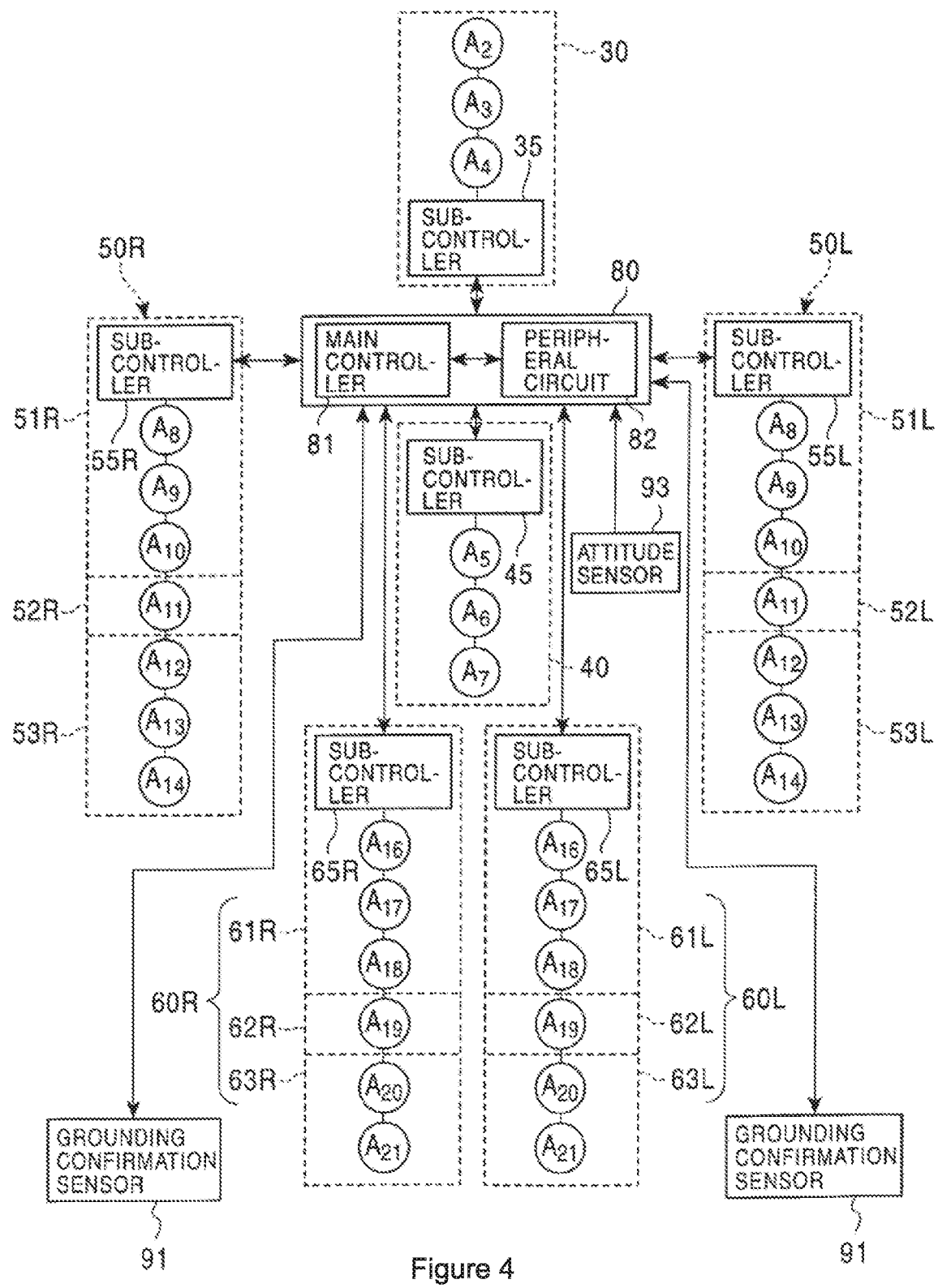
FIG. 4 is a schematic diagram of a control system for a robot, in accordance with embodiments of the present invention.

FIG. 4 schematically illustrates an exemplary control system for the robot platform 100.

A control unit 80 operates to co-ordinate the overall motion/actions of the robot. The control unit 80 has a main control unit 81 including main circuit components (not shown) such as a CPU (central processing unit) and a memory, and typically a periphery circuit 82 including an interface (not shown) for sending and receiving data and/or commands to and from a power supply circuit (not shown) and each component of the robot. The control unit may comprise a communication interface and communication device for receiving data and/or commands by remote-controlling. The control unit can be located anywhere suitable within the robot.

As shown in FIG. 4, the robot has logical units 30 (head), 40 (torso), and 50R/L and 60R/L each representing the corresponding one of four human limbs. The degrees-of-freedom of the robot 100 shown in FIG. 3 are implemented by the corresponding actuator within each unit. Hence the head unit 30 has a neck-joint yaw-axis actuator A2, a neck-joint pitch-axis actuator A3, and a neck-joint roll-axis actuator A4 disposed therein for representing the neck-joint yaw-axis 2, the neck-joint pitch-axis 3, and the neck-joint roll-axis 4, respectively. Meanwhile the trunk unit 40 has a trunk pitch-axis actuator A5, a trunk roll-axis actuator A6, and a trunk yaw-axis actuator A7 disposed therein for representing the trunk pitch-axis 5, the trunk roll-axis 6, and the trunk yaw-axis 7, respectively. Similarly the arm units 50R/L are broken down into upper-arm units 51R/L, elbow-joint units 52R/L, and forearm units 53R/L. Each of the arm units 50R/L has a shoulder-joint pitch-axis actuator A8, a shoulder-joint roll-axis actuator A9, an upper-arm yaw-axis actuator A10, an elbow-joint pitch-axis actuator A11, an elbow-joint roll-axis actuator A12, a wrist-joint pitch-axis actuator A13, and a wrist-joint roll-axis actuator A14 disposed therein for representing the shoulder-joint pitch-axis 8, the shoulder-joint roll-axis 9, the upper-arm yaw-axis 10, the elbow-joint pitch-axis 11, an elbow-joint roll-axis 12, the wrist-joint pitch-axis 13, and the wrist-joint roll-axis 14, respectively. Finally the leg units 60R/L are broken down into thigh units 61R/L, knee units 62R/L, and second-thigh units 63R/L. Each of the leg units 60 R/L has a hip-joint yaw-axis actuator A16, a hip-joint pitch-axis actuator A17, a hip-joint roll-axis actuator A18, a knee-joint pitch-axis actuator A19, an ankle-joint pitch-axis actuator A20, and an ankle-joint roll-axis actuator A21 disposed therein for representing the hip-joint yaw-axis 16, the hip-joint pitch-axis 17, the hip-joint roll-axis 18, the knee-joint pitch-axis 19, the ankle-joint pitch-axis 20, and the ankle-joint roll-axis 21, respectively. Optionally the head unit 30, the trunk unit 40, the arm units 50, and the leg units 60 may have sub-controllers 35, 45, 55, and 65 for driving the corresponding actuators disposed therein.

Hence by issuing appropriate commands, the main controller (81) can control the driving of the joint actuators included in the robot 100 to implement the desired action. For example, the controller may implement a walking action by implementing successive phases, as follows:

(1) Single support phase (left leg) with the right leg off the walking surface;

(2) Double support phase with the right foot touching the walking surface;

(3) Single support phase (right leg) with the left leg off the walking surface; and (4) Double support phase with the left foot touching the walking surface.

Each phase in turn comprises the control of a plurality of actuators, both within the relevant leg and potentially elsewhere in the robot, for example moving the opposing arm and/or attitude of the torso to maintain the centre of gravity of the robot over the supporting foot or feet.

Optionally, to detect the manner and/or extent of a physical interaction with an object and/or the environment, physical sensors may be provided.

Hence in the exemplary robot, the feet 22 have grounding detection sensors 91 (e.g. a proximity sensor or microswitch) for detecting the grounding of the feet 22 mounted on legs 60R and 60L respectively, and the torso is provided with an attitude sensor 93 (e.g. an acceleration sensor and/or a gyro-sensor) for measuring the trunk attitude. Outputs of the grounding detection sensors 91 are used to determine whether each of the right and left legs is in a standing state or a swinging state during the walking action, whilst an output of the attitude sensor 93 is used to detect an inclination and an attitude of the trunk. Other sensors may also be provided, for example on a gripping component of the robot, to detect that an object is being held.

The robot may also be equipped with sensors to provide additional senses. Hence for example the robot may be equipped with one or more cameras, enabling the control unit (or a remote system to which sensor-based data is sent) to recognise a user of the robot, or a target object for retrieval. Similarly one or more microphones may be provided to enable voice control or interaction by a user. Any other suitable sensor may be provided, according to the robot's intended purpose. For example, a security robot intended to patrol a property may include heat and smoke sensors, and GPS.

Hence more generally, a robot platform may comprise any suitable form factor and comprise those degrees of freedom necessary to perform an intended task or tasks, achieved by the use of corresponding actuators that respond to control signals from a local or remote controller that in turn operates under suitable software instruction to generate a series of control signals corresponding to a performance of the intended task(s).

In order to provide software instruction to generate such control signals, a robot software development system may be provided for developing control sequences for desired actions, and/or for developing decision making logic to enable the robot control system to respond to user commands and/or environmental features.

As part of this development system, a virtual robot (i.e. a simulation) may be used in order to simplify the process of implementing test software (for example by avoiding the need to embed test software within robot hardware that may not have simple user-serviceable parts, or to simulate an environment or action where a mistake in the software could damage a real robot). The virtual robot may be characterised by the dimensions and degrees of freedom of the robot, etc., and an interpreter or API operable to respond to control signals to adjust the state of the virtual robot accordingly.

Control software and/or scripts to use with such software may then be developed using, and to use, any suitable techniques, including rule based/procedural methods, and/or machine learning/neural network based methods.

Figure 5:
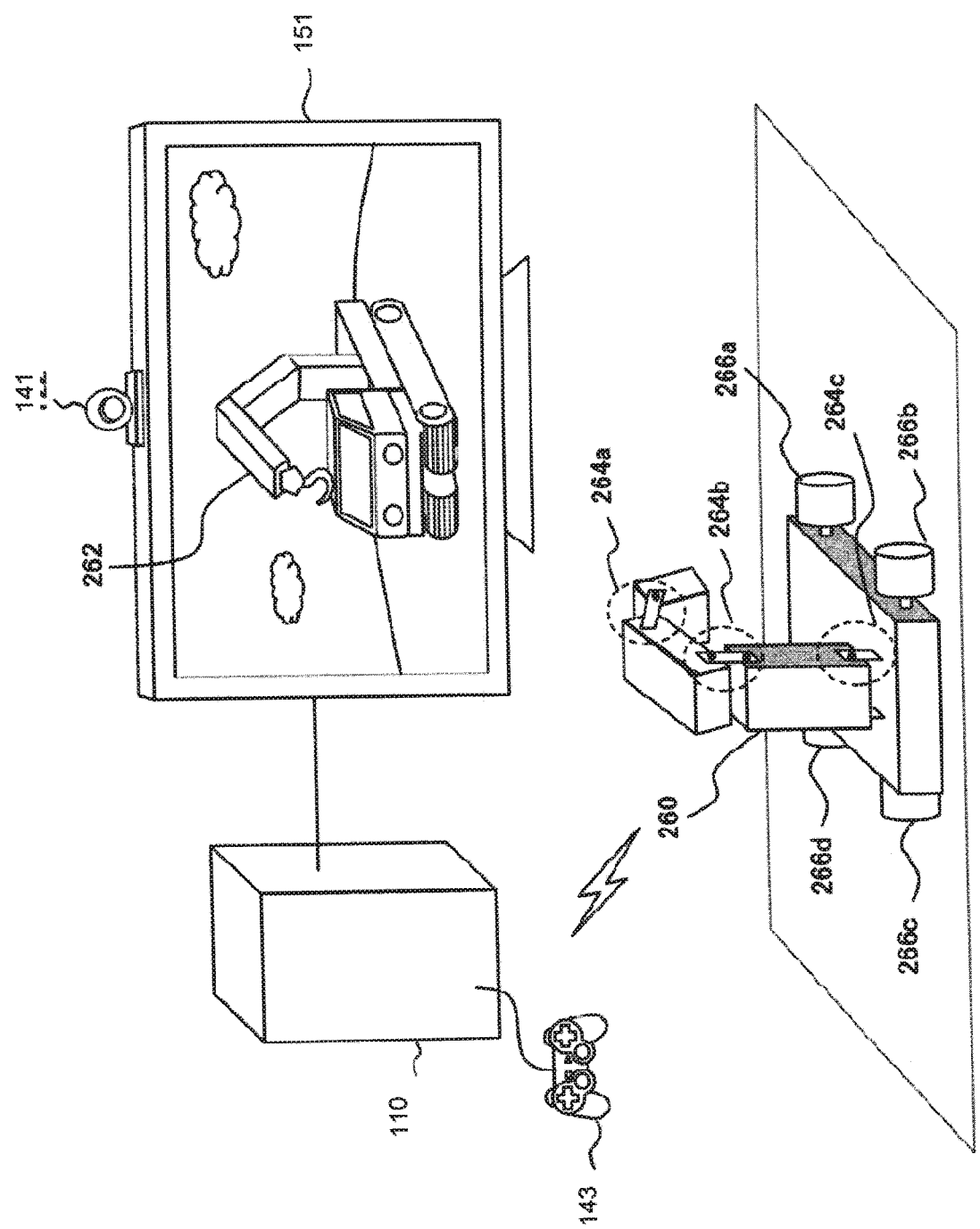
FIG. 5 is a schematic diagram of an interactive robot system in accordance with embodiments of the present invention.

Referring to FIG. 5, in an exemplary usage scenario a (toy) real robot crane 260 and a corresponding simulation (virtual robot crane 262) interact for entertainment purposes, for example mirroring each other's actions or behaving in a complementary manner, and/or using sensor data from the real or virtual robot to control actions of the other. The virtual robot may be graphically embellished compared to the real robot, for example having a face, or resembling an object or creature only approximated by the real robot.

In this example, the robot platform 260 has motorised wheels 266a-d and one articulated arm with actuators 264a-c. However it will be appreciated that any suitable form factor may be chosen, such as for example the humanoid robot 100 of FIG. 1, or a dog-shaped robot (not shown) or a spheroidal robot (not shown).

In FIG. 5, control of both the virtual and real robots is performed by a general purpose computer (110) operating under suitable software instructions, such as the Sony® PlayStation 4®. A user can interact with the PlayStation and hence optionally indirectly interact with one or both of the real and virtual robots using any suitable interface, such as a videogame controller 143. The PlayStation can detect the state of the real robot by receiving telemetry and other status data from the robot, and/or from analysis of an image of the real robot captured by a video camera 141. Alternatively or in addition the PlayStation can assume the state of the real robot based on expected outcomes of the commands sent to it. Hence for example, the PlayStation may analyse captured images of the real robot in expected final poses to determine its position and orientation, but assume the state of the robot during intermediate states such as transitions between poses.

In the example scenario, the user provides inputs to control the real robot via the PlayStation (for example indicating an amount and direction of travel with one joystick, and a vertical and horizontal position of the arm end with another joystick). These inputs are interpreted by the PlayStation into control signals for the robot. Meanwhile the virtual simulation of the robot may also be controlled in a corresponding or complementary manner using the simulation technique described above, according to the mode of play.

Alternatively or in addition, the user may directly control the real robot via its own interface or by direct manipulation, and the state of the robot may be detected by the PlayStation (e.g. via image analysis and/or telemetry data from the robot as described previously) and used to set a corresponding state of the virtual robot.

It will be appreciated that the virtual robot may not be displayed at all, but may merely act as a proxy for the real robot within a virtual environment. Hence for example the image of the real robot may be extracted from a captured video image and embedded within a generated virtual environment in an augmented reality application, and then actions of the real robot can be made to appear to have an effect in the virtual environment by virtue of those interactions occurring with a corresponding virtual robot in the environment mirroring the state of the real robot.

Alternatively, a virtual robot may not be used at all, and the PlayStation may simply provide control and/or state analysis for the real robot. Hence for example the PlayStation may monitor the robot via the camera, and cause it to pick up a ball or other target object placed within the camera's field of view by the user.

Hence more generally, a robot platform may interact with a general purpose computer such as the Sony® PlayStation 4® to obtain a series of control signals relating to setting a state of the robot, for the purposes of control by a user and/or control by the PlayStation to achieve a predetermined task or goal. Optionally the state, task or goal may be at least in part defined within or in response to a virtual environment, and may make use of a simulation of the robot.

While robots have been shown that approximate the forms of objects or people, in some cases it may be advantageous to provide robots that take a more function-oriented form.

Figure 6:
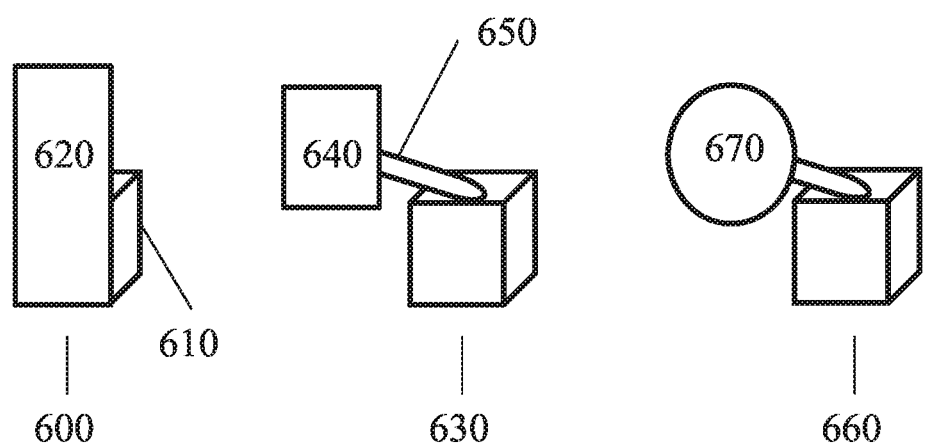
FIG. 6 schematically illustrates a plurality of robots.

This is particularly true when the robot is to be used in conjunction with a VR arrangement, as the user is expected to not be able to see the robot in such a case. FIG. 6 schematically illustrates a plurality of such forms, comprising a base and a barrier.

While each of the robots shown in FIG. 6 utilise the same robot base 610, of course any suitable base may be used. For example, any form of robot may be used, so long as the base is capable of manipulating the barrier in a suitable manner; even complex robot forms such as humanoid robots may be used to manipulate a barrier, although this may not be desirable due to the increased cost and complexity of such a robot. The base 610 may comprise any suitable features; for example, processing apparatus, apparatus for enabling movement of the base (such as wheels), imaging hardware, and audio outputs.

A first robot 600 comprises a base 610 and a barrier 620. This barrier 620 is affixed to the base 610 such that the barrier 620 may not be moved independently of the base 610; therefore in order to change the location and/or orientation of the barrier 620 it is necessary to move the whole robot 600. While such an arrangement may not be as versatile or responsive as an arrangement in which the barrier 620 may be moved independently of the base 610, the simplicity of the arrangement may be advantageous in that the device may be more robust and may be produced more cheaply.

A second robot 630 is an example of a robot with a barrier that is not directly attached to the base. The robot 630 has a barrier 640 that is attached to the base 610 via an actuable arm 650. As a result of this a greater range of motion may be possible for the barrier 640, relative to the barrier 620 of the robot 600.

The barrier 640 may also be able to have a reduced size in view of the increased range of motion that is enabled by the use of a connecting arm 650, as the barrier 640 may be positioned with a greater precision.

The arm 650 may be any suitable connector that is operable to join the barrier 640 to the base 610, and to provide a relative motion between the two. For example, a rod that is operable to vary its position/orientation with respect to the base 610 may be suitable. A flexible (or foldable, such as a rod with several connecting joints that may be operated individually) solution may also be used, and/or a connector that is operable to vary its length. Of course, a plurality of connectors may be provided where appropriate—this may assist with distributing the weight of the barrier 640 and/or increase the possible range of motion of the barrier 640.

A third robot 660 is shown to illustrate an example of a third barrier 670. This barrier 670 is circular, rather than rectangular, and serves to illustrate that any suitable shape may be used for the barrier. While two-dimensional profiles for the barriers have been considered here, it is of course possible that the barrier has a noticeably three-dimensional profile rather than presenting a flat plane to the user; for example, rather than the barrier 670 being circular, it could be a dome or hemisphere such that a curved face is presented to a user.

These examples may of course be combined in any suitable manner—for example, multiple barriers of different types could be provided, or barriers may be designed that are operable to vary their shape.

The barriers themselves may be made from any suitable a rigid or resilient material, or may be inflatable and deflatable, to facilitate storage when not in use. Where more than one barrier is provided by a user, different barriers may be made from similar or different materials, according to any anticipated requirement or functionality for the respective barrier.

The barriers themselves may comprise any additional functionality as desired. For example, additional features may be provided so as to increase the immersiveness of a user experience or to assist with the positioning of the robot and/or barrier. Any number of the below examples may be implemented, alone or in combination with the other exemplary features that are listed.

In some embodiments, the barrier may have two or more different sides that are able to be presented to a user. For example, a barrier may have a rough side and a smooth side such that a particular texture of the barrier may be selected for presenting to a user. The robot may then manipulate the barrier to present a side to the user that best matches the apparent texture of a virtual barrier within the VR presentation.

In some examples, rather than being a flat surface such as those barriers shown in FIG. 6, the barrier may have a three-dimensional shape such as a cube or pyramid, and the barrier may be actuable such that any of the sides may be presented to the user. Each of these sides may provide a different experience for the user—for example, they may be formed of different materials (such as using hard/soft materials for contrasting sides of the barrier) or take different shapes, such that the feel of the surface is different when touched by a user or the interaction with the surface by a user may be different. This is an example of an embodiment in which one or more of the barrier elements comprise one or more different surfaces that may be selectively presented to a user.

In some embodiments, it is considered that the temperature of a surface of the barrier may be controlled by the robot. This may be useful in communicating game information to a user, or in generating a desired sensation. For example, if the barrier were used to simulate a door that the user can interact with, a higher temperature may be used to indicate that there is a fire behind the door. Alternatively, or in addition, the temperature control may be used to assist in simulating different materials—for example, a user would expect a metallic surface to feel cooler than a wooden surface at the same temperature (due to the increased thermal conduction of metals) and therefore applying a cooling effect may assist in improving the immersion of the VR experience.

Similarly, the barrier may be provided with hardware that is operable to cause the barrier to vibrate or provide any other form of haptic feedback. Such a feature may be employed in a similar manner to that of the temperature control; the vibrations may be used to communicate game information, for example, or to enhance the sense of immersion of a user when interacting with the barrier.

Of course, the different surface properties of the barrier could be provided on a time-varying basis; for example, a barrier may be formed of a number of panels which may be flipped, shifted, rotated, shuffled, and/or otherwise modified on an individual (or other) basis. Alternatively, or in addition, extendable components may be extended/retracted to provide a greater/smaller number of physical features for a user to interact with. An example of such a feature would be an object used to simulate a doorknob when presented to a user, which would of course be inappropriate for user interaction in many other scenarios that do not involve a user interacting with a door.

As noted above, retractable objects could be provided on the surface of a barrier. Alternatively, or in addition, fixed objects (either permanently affixed, or temporarily affixed by a user) may also be provided. The barrier may be rotated in order to enable a user interaction with a particular object, for example; the objects that are affixed may be identified using any suitable method, including user identification, RFID tags (or the like), or camera-based identification techniques. Each of these is a further example of an embodiment in which one or more of the barrier elements comprise one or more different surfaces that may be selectively presented to a user.

The robot may be provided with speakers so as to be able to provide an audio output, and these may be located in the body of the robot and/or in the barrier.

The robot may also be provided with one or more cameras, located at the body and/or the barrier portions of the robot. These cameras may be useful for capturing images of the user and/or physical environment to assist with a tracking or localisation function, for example. For example, images captured of the user by the robot may be used to supplement image data captured by an associated processing device (such as a camera associated with a games console) in order to improve the user-tracking process.

Figure 7:
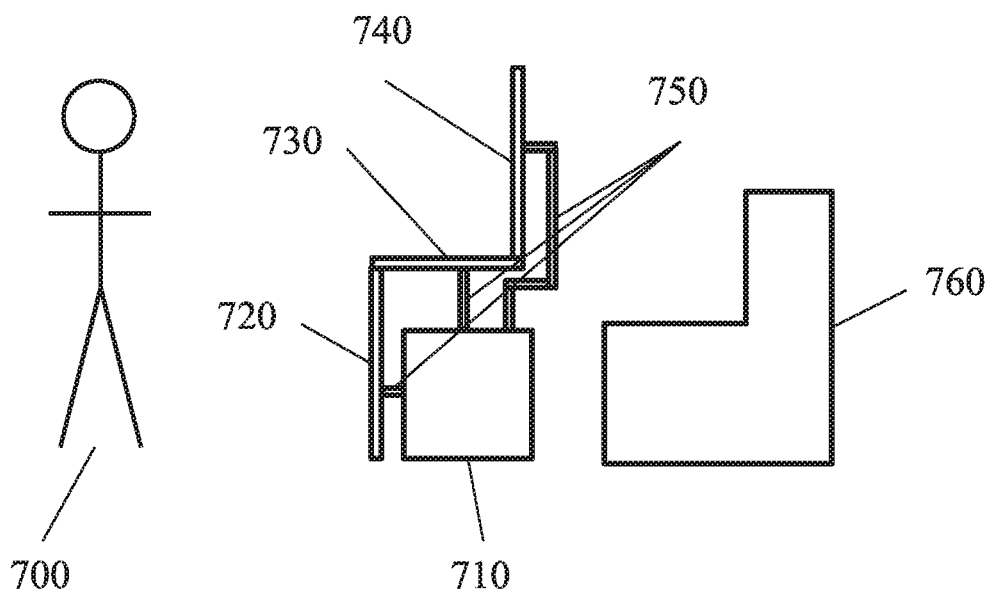
FIG. 7 schematically illustrates a robot comprising a plurality of barrier elements.

FIG. 7 schematically illustrates an embodiment in which a robot comprises a plurality of panels (or panel sections) that act as a barrier. By utilising such a feature, the robot is able to provide a barrier with a stepped (or otherwise non-planar) barrier.

In FIG. 7 a user 700 is interacting with the robot 710, which is located near a chair 760. The robot 710 here may be configured to act as a barrier to prevent the user tripping and falling onto the chair 760, or it may act as a barrier for interaction with as a part of a virtual reality (or other interactive) experience provided to the user.

The robot 710 comprises three barriers (or barrier portions) 720, 730 and 740 that are each connected using a corresponding one of the connecting arms 750. These may be three entirely distinct barriers that are able to be operated individually, or may be three separate segments or portions of a single barrier that may be articulated relative to one another. Of course, the barriers 720, 730 and 740 could be arranged so as to present a single flat surface to the user or indeed any other possible configuration.

The robot 710 is illustrated in FIG. 7 as being close to the chair 760, however the position of the robot 710 may be varied as appropriate. For example, the robot 710 may be moved closer to the user 700 in order to mimic the position of an object or surface present in a virtual environment that is displayed to the user 700 (for example, via an HMD or any other suitable display). Alternatively, the robot 710 may be moved closer to the chair 760 so as to provide a larger play area before interfering with the user's motion to prevent them falling onto the chair.

It will be appreciated that where the robot is acting to prevent the user tripping over the chair, it would be desirable to avoid the user tripping over the robot instead. As a result, optionally the robot may have flexible panels or other extensions (such as whiskers) near the base of the robot, and/or at hip/hand height (which may be adjusted to suit the user); these flexible protrusions will be encountered by the user first when moving toward the robot, alerting them to the present of the robot before tripping over it.

Optionally, when the robot is presenting the barrier as co-incident with a virtual barrier (i.e. it has a similar position relative to the user in real-space as a virtual feature of the environment does in virtual space, such as a wall, door or table), then the robot may not move if the user touches it, or comes within a threshold distance of any proximity sensors.

Meanwhile, if the robot is not co-incident with an apparent in-game barrier but is instead either idle or blocking a potential real-world trip hazard, then the robot will move if the user touches it, or comes within a threshold distance of any proximity sensors. In this way the robot can limit its own capability to trip the user when the user is not expecting to encounter a barrier.

In some embodiments, a default position of the barrier (or resting position—referring to the position assumed by the barrier when not in direct use by a user) may be just out of reach of the user—this could be based upon any suitable indication of the possible reach of the user, including any peripherals that they may be using or any likely motions to be performed by the user. This may be advantageous in that the user is unable to interact with the barrier unless it is expected, whilst enabling the robot to stay sufficiently close to the user so as to enable a desired user interaction to be provided rapidly.

Alternatively, or in addition, the default position of the barrier may be determined in dependence upon the type of content (genre of game, for example, or game/movie distinction) being provided to the user, features within the content, or based upon a predefined safe play space.

An example of the first of these would be that in a game in which the barrier is rarely used for interactions to simulate a surface or the like it may be appropriate for the robot to reside in an area further away from the user so as to reduce the chances of accidental interaction further. For example, in non-interactive content the barrier may only be used for safety purposes and so could simply reside near a closest obstacle to the user or the like.

An example of the second of these is in that the robot may be located in a position in which an object or surface that is most likely to be interacted with occupies in the virtual environment. For example, the robot could be configured to pre-emptively position itself in the correct location to represent the only door leading out of a virtual room that is presented to the viewer via a display.

An example of the last of these is that of a user defining a safe play space (or having one automatically mapped out by a processing device associated with the robot). A safe play space may be used to indicate the allowed extent of a user's motion before they are likely to encounter any obstacles or hazards within the real environment. The robot may then place itself at the closest point to the user on or near the periphery of the safe space, to act as a safety barrier. This may be useful as the viewer may be unaware of where they are in the real environment if they are viewing immersive VR content. The safe play space may be defined so as to incorporate a region surrounding the safe play space in which the robot may operate as a barrier; alternatively, the robot's motion may be controlled so as to remain within the safe play space, for example to avoid the robot itself knocking over or damaging items in the environment.

When acting to protect the user from hazards in the physical environment, or enforcing a perimeter within the physical environment, then as suggested above with respect to the first and third examples the default position of the robot barrier may be between the user and the closest identified boundary (either derived from the physical environment, or the defined perimeter), so that the robot is well placed to block the user's movement over the boundary. Alternatively or in addition, the default position of the robot barrier may be between the path of a user and an identified boundary; in other words, placing itself in a position between a user and a boundary that the user is moving towards; hence a position that intercepts the user at or near the boundary based on their current direction of movement. It will be appreciated that over time these two default positions converge as the user approaches a physical boundary, whether this corresponds to a safe play perimeter or a physical obstacle. To save power, a robot may not move until the user is within a predetermined distance from a physical boundary. This predetermined distance may depend upon the available speed of the robot, the path length from the robot to a point of intersection between the user and the robot at the relevant part of the physical boundary, and the speed of movement of the user towards the boundary as they reach a predetermined distance from it for it, which may contribute to the amount of time needed by the robot to intercept the user and hence the amount of distance acceptable between the user and the boundary. Clearly where two or more robots are provided, they can share this function and so the predetermined distance to a given boundary may be shorter.

While references have been made to the movement of the robot, optionally the robot may remain stationary and only the barrier or barriers move where appropriate. For example, if a desired motion of the robot is identified that is smaller than the available range of motion of the barrier or barriers, then the robot itself may remain stationary and only the barriers are moved. This enables the robot to provide a barrier in the correct position without having to relocate itself each time.

The motion of the barrier and/or robot may be controlled by an external processing device (such as a games console or computer), by processing elements located within the robot itself, or any other suitable combination of devices. The motion may be determined in dependence upon a separation between a user and an object in the virtual environment, for example; the position of the robot may therefore be changed in response to the movement of the user, the user's virtual avatar present in the virtual environment, and/or the movement of a virtual object in the virtual environment.

It may be advantageous for the location and/or orientation of the robot to be identified within the environment; this may be achieved in any of a number of ways. For example, the robot may comprise a number of on-board sensors, such as accelerometers and gyroscopes, to detect motion of the robot. Alternatively, or in addition, short-range wireless communications (such as Bluetooth®) may be used to derive location and/or orientation information (such as the use of one or more signal emitters and receivers to generate triangulation information). Alternatively, or in addition, video- or audio-based tracking methods may be utilised to identify a location of the robot in the environment.

In some embodiments, it may be advantageous to perform mapping of the real environment and to control the robot's position based upon this generated map. Such a map may be generated and maintained in any suitable manner. In some examples, a camera (or a camera array) is provided in association with a processing device; the camera (or camera array) is able to image a substantial portion of the real environment and to generate mapping information for the environment in dependence upon the captured images. Alternatively, or in addition, the robot may comprise a number of cameras that may be used for this purpose.

The robot may also (or instead) be configured to perform SLAM (Simultaneous Localisation And Mapping) techniques in order to generate a map of the environment whilst determining the location of the robot within the environment.

The mapping processes mentioned may also comprise identifying objects in the environment; this may be particularly useful when seeking to define safe play spaces or when identifying objects that may represent hazards to a user. In addition to this, a correspondence between the generated map of the real environment and a map of the virtual environment (or a portion of the virtual environment) may be defined such that movements in the virtual environment may be translated to motion of the robot in the real environment as desired.

As discussed above, the movement of the robot may be controlled in dependence upon such mapping information. For example, the mapping information (in conjunction with user tracking information) may be used to identify when a user approaches an obstacle or boundary in the real environment. The robot may then be controlled so as to move to a suitable position, identified using the mapping data, so as to act as a barrier between the user and the obstacle.

In some embodiments, the robot is controlled so as to modify the position of the barrier (or barriers) relative to the base unit of the robot. As noted above, this may be performed for fine-scale adjustments to the barrier position as this may represent a simpler option than moving the whole robot. Alternatively, or in addition, this is performed so as to enable a change in the height or angle of one or more barrier elements.

It may be desirable to modify the angle of the barrier or barriers for a number of reasons. For example, a change in the angle of the surface (or the relative angles between two or more barrier elements) may increase the sense of immersion for a user as it may be possible to more closely replicate the surface/object (and/or its orientation) with which a user interacts in the virtual environment. Further to this, it may be the case that a change in angle is considered to provide a safer barrier. For instance, rather than a stepped arrangement as shown in FIG. 7 it may be safer to provide a sloped upper panel above the barrier element 720.

Hence for example, if the user approaches the barrier, an upper part of the barrier may be moved forward to that the robot effectively leans in, making it more likely that the user will encounter the upper part of the robot first, rather than with their foot.

Similarly, a rotation of the barrier may be considered if the barrier does not possess a high degree of rotational symmetry (such as a square or rectangle, rather than a circular barrier) so as to be able to simulate different shapes for a user to interact with. This is possible as it is considered likely that a user only interacts with a small section of the barrier at any one time; therefore a triangular section (corresponding to the corner of a rectangular barrier) may be provided to a user by adopting a suitable rotation and position.

Each of the above paragraphs may be considered to be examples of an embodiment in which one or more of the barrier elements are rotatable, albeit with different directions of rotation.

The modification of the barrier height may provide similar advantages to that of a modification of the angle. A further consideration is that of the height of the barrier relative to the user's centre of gravity (or another measure, such as leg length). By raising the barrier to a suitable height with respect to one or more of these, a safer barrier may be provided. One reasons for this is that a barrier that is too low for a particular user may present a trip hazard, or may cause a user to lean too far and fall over the barrier which may lead to injury. In other words, the configuration of one or more barrier elements may be determined in dependence upon a user's height.

In some embodiments, the barrier position and/or orientation may be varied so as to enhance the user interaction. For example, the size, shape, position, orientation or configuration (such as surface properties) of the barrier or barriers may be modified.

Figure 8:
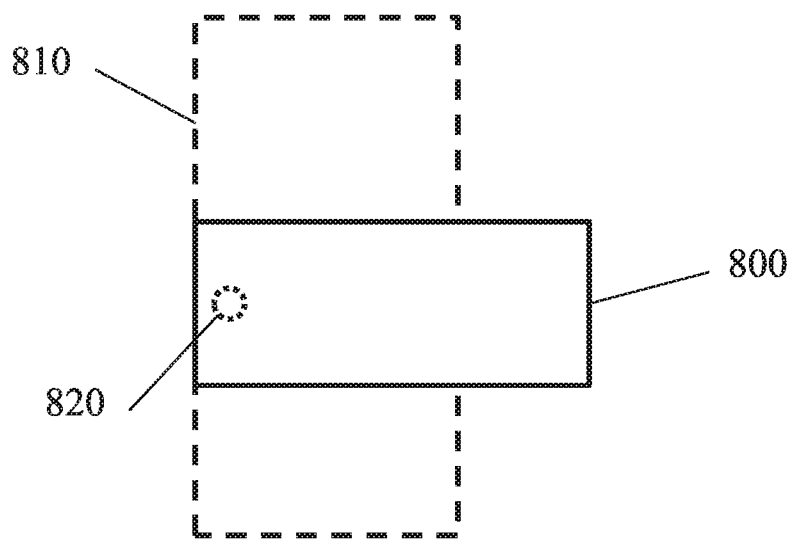
FIG. 8 schematically illustrates an example of barrier positioning with respect to a virtual object.

FIG. 8 schematically illustrates an example of positioning of a barrier that may be provided, despite a mismatch in the shape and size of the barrier with respect to the virtual object that is displayed to the user. This is an example in which one or more barrier elements are arranged such that at least an edge of the one or more barrier elements is aligned with the edge of a virtual object in the virtual environment.

The barrier 800 has a wide, rectangular shape that clearly differs in both shape and size to that of a virtual door 810 that is displayed to a user. However, in such an embodiment, it is considered that the user is most likely to interact with the virtual door 810 at the position of a virtual doorknob 820. In such a case, it may be advantageous to align the barrier with the nearest edge to the identified interaction area such that the boundary of the virtual door 810 and real barrier 800 are aligned at the most likely interaction area. The location of the most likely interaction area may be determined in any suitable manner; for example, it could be determined in response to historical/predicted user behaviour, or information about the virtual objects themselves.

The fact that the barrier 800 extends beyond the virtual door 810 in the opposite direction is unlikely to become apparent to the user, as they are unlikely to interact with the other side of the door. Such an embodiment may be advantageous, as the ability of the user to interact with the edges of the barrier as they coincide with the edges of virtual objects may be beneficial in increasing a sense of immersion.

It is clear that modifications of the barrier position and/or orientation may therefore be effected in response to factors relating to either of the virtual or real environments. Of course, in some embodiments factors relating to each of these may be considered together so as to identify a desirable barrier position and/or orientation. In some embodiments, different factors may have different priorities; for example, a movement in order to improve the immersiveness of the user experience may be ignored in favour of a movement in order to preserve user safety.

In some embodiments, it is possible that objects in the virtual environment may be located/designed so as to be compatible with the range of motion that is achievable using the robot. For example, if a robot may only provide a barrier up to 1.5 m in height then objects in the virtual environment may be scaled in such a manner that the barrier is operable to represent those objects. The scaled objects may be all of the objects in the environment, or a subset of those objects. This is an example of an embodiment in which one or more boundaries in the virtual environment may be modified in dependence upon the capabilities of the robot.

Alternatively, or in addition, objects may be positioned in the virtual environment such that the motion of the robot is able to represent those objects without exceeding defined boundaries in the real environment (such as the boundaries of a defined safe space, or hitting objects in the real environment). Of course, the virtual environment (or at least an interactive part of the virtual environment) may also be scaled to correspond in size (and/or shape, in some embodiments) to the area in which the robot may operate.

The robot may further comprise a warning system that is operable to enhance the safety aspects of the robot; of course, this system could also be used to increase the immersiveness of the user experience. A warning system may be advantageous in that an imminent collision (or indeed, a detected collision) may be signalled to a user. This may assist the user in avoiding injury, for example by crashing into the barrier unexpectedly, or to let them know that they are approaching the edge of a safe play area or the like.

A warning may take any of a number of forms, either independently or in any suitable combination. For example, visual indicators may be provided to a user using a display; alternatively, or in addition, audible indicators may be used such as an alarm sound or a spoken indication of the situation. Other methods are also considered, such as a vibration of the barrier, which may be used to communicate a warning to the user.

Such a warning may also be combined with a change in operation of the VR system, such as the robot sending a signal that causes a VR experience to be paused or otherwise interrupted so as to show a view of the real environment (such as using a camera feed or see-through display). Alternatively, or in addition, objects in the virtual environment may be moved in conjunction with the warning so as to reduce the chances of a negative interaction. For example, if it is determined that a user strays too close to a real-world obstacle then objects in the virtual environment may be moved so as to encourage a user to move away from the object.

As noted previously herein, the robot itself may have cameras or other proximity sensors (infra red distance detectors, whiskers and the like), that enable enhanced monitoring of the user's position with respect to the real environment, in the case where the user may stray outside of the field of view of a primary camera. The additional camera(s) or sensors may provide a means to alert the user when it is no possible to detect danger using the main camera. Conversely, it may allow a user to stray partially or wholly outside the main camera's field of view without the need for a precautionary warning from the VR system, because the user's position can still be monitored, thereby improving overall immersiveness by reducing the frequency of such precautionary warnings.

Figure 9:
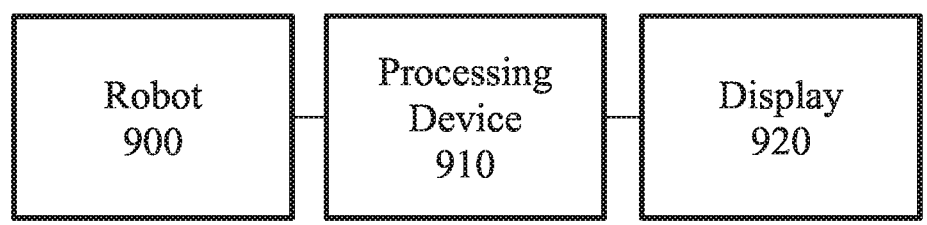
FIG. 9 schematically illustrates a system for restricting user motion.

FIG. 9 schematically illustrates a system for restricting user motion using a robot, the system comprising a robot 900, a processing device 910 and a display 920. While shown as separate units here, the different functions may be provided by any number of devices; for example, the functions associated with the processing device 910 may be provided by more than one processing device. In some embodiments, such as those using a mobile phone, the processing device 910 and display 920 may be provided as a single unit. In some embodiments, it is envisaged that all three units may be provided as a single device.

The robot 900 may be a robot according to any of the embodiments described above, and should be a robot comprising one or more barrier elements. A barrier element may be an individual barrier, or an individually operable segment of a composite barrier. Further details about the robot are discussed with reference to FIG. 10 below.

The processing device 910 may be any suitable device for providing content to a user, such as a games console, mobile device, or a computer. The processing device 910 may also be suitable for modifying the content that is to be provided to a user, as well as generating instructions for controlling the robot 900. In some embodiments, the processing device 910 is operable to generate mapping information and to track the user and/or robot 900.

The processing device 910 is operable as a processing unit operable to identify one or more boundaries in a real environment and/or a virtual environment, the boundaries corresponding to a predetermined extent of allowed motion in that environment. The processing device 910 may further be operable as a control unit operable to control the robot such that at least one barrier element is arranged at one of the identified boundaries; however this feature may be implemented at the robot 900 (for example, at the processing unit 1020).

As noted above, in some embodiments one or more boundaries correspond to the locations of objects in the real environment. Alternatively, or in addition, one or more boundaries may correspond to the locations of virtual objects in the virtual environment. One or more boundaries correspond to the perimeter of a predefined region of the real environment, in some embodiments, for example the perimeter of a safe play area as discussed above. In some embodiments, the processing device 910 is operable to modify the virtual environment such that one or more boundaries in the virtual environment may be modified in dependence upon the capabilities of the robot.

The display 920, for example an HMD, is operable to provide content to a user. Other display devices may also be suitable, such as a television or portable display (for example, a mobile phone).

Any of the devices 900, 910 and 920 may have one or more cameras and/or microphones (or arrays of either) associated with that device to provide a user and/or robot tracking function, for example. This is an example of a system that comprises one or more cameras operable to capture images of the real environment.

Figure 10:
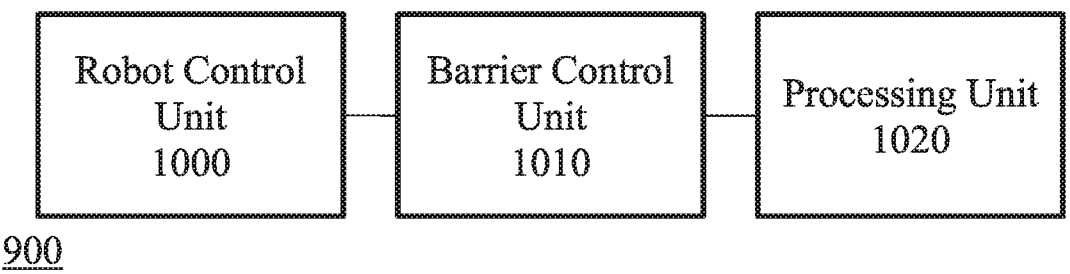
FIG. 10 schematically illustrates a robot for use in a system for restricting user motion.

FIG. 10 schematically illustrates a robot 900, comprising a robot control unit 1000, a barrier control unit 1010 and a processing unit 1020. Of course, these units may be combined as appropriate such that a single processing unit performs multiple functions. Additionally, further processing units or functionality may be provided as appropriate; an example of this is hardware motion detectors such as accelerometers or gyroscopes for tracking motion of the robot 900 and communication units for communicating with the processing device 910 and/or display 920.

The robot control unit 1000 is operable to control the motion of the robot 900 itself; for example, this may comprise causing wheels of the robot to rotate in a desired manner so as to move the robot to an appropriate location. The robot control unit 1000 may be operable to identify an appropriate or desirable location for the robot 900 to occupy, for example by interpreting information about the virtual environment or user motion. This may further comprise interpreting mapping/positional data for real and/or virtual environments, although of course this may be performed by the processing device 910.

The barrier control unit 1010 is operable to control the barrier (or barriers) associated with the robot 900. This may include modifying the position and/or orientation of the barrier(s), as well as any other features of the barrier(s) that are provided; examples discussed above include temperature and variable textures that may be presented to a user. The barrier control unit 1010 may also be operable to determine the suitable configuration of the barrier, for example from information about the real and/or virtual environment.

The processing unit 1020 is operable to perform general processing functions that do not directly relate to the operation of the robot; for example, performing processing for generating and/or implementing warning signals and deriving position/orientation information for the robot 900. The processing unit 1020 may therefore be operable to generate a warning of imminent contact between a user and one or more of the barrier elements.

While the robot 900 has been discussed so far primarily as a rigid or resilient unit of a fixed size, in some embodiments it is considered that the robot 900 may comprise one or more inflatable or foldable components so as to facilitate a compact storage space. This may be advantageous both in terms of ease of storage, and in increasing the range of possible barrier positions without substantially increasing the size of the robot in a permanent fashion. For instance, a robot may be equipped with a central column that is inflatable, such that it increases in height when inflated, while folding and/or inflatable barriers may also be provided. This is an example of the robot and/or one or more of the barrier elements comprising inflatable and/or folding elements.

Figure 11:
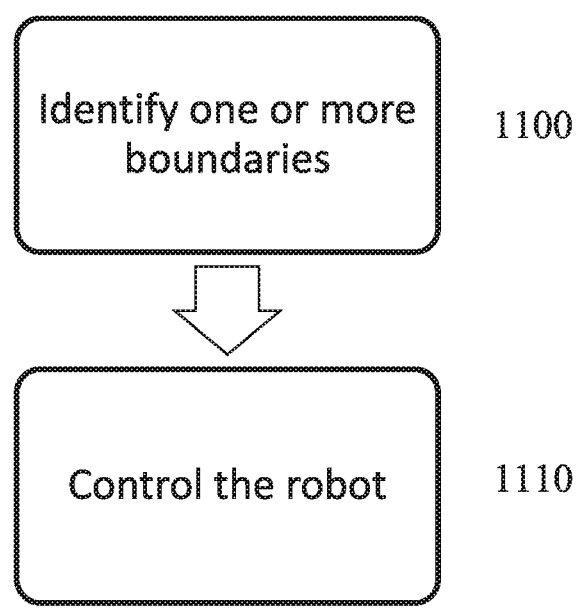
FIG. 11 schematically illustrates a method for restricting user motion.

FIG. 11 schematically illustrates a method for restricting user motion using a robot comprising one or more barrier elements.

A step 1100 comprises identifying one or more boundaries in a real environment and/or a virtual environment, the boundaries corresponding to a predetermined extent of allowed motion in that environment; and A step 1110 comprises controlling the robot such that at least one barrier element is arranged at a position corresponding to one of the identified boundaries.

Of course, any suitable additional steps may be implemented in order to provide any of the features and functions described above; for example, a mapping step may be implemented before the identification step 1100 if existing mapping data is not already available. A further example is that of a warning generating step being performed after the robot control step 1110.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

The invention claimed is:

1. A system for restricting motion, of a user, using a robot, the system comprising:
   a robot comprising one or more barrier elements;
   a processing unit operable to identify one or more boundaries in a real environment, the or each boundary corresponding to a predetermined extent of allowed motion in that environment; and
   a control unit operable to control the robot such that at least one barrier element is arranged at a position corresponding to one of the identified boundaries; wherein:
   the robot is operable by one or more of the processing unit and the control unit to position itself or a barrier element to act as a safety barrier, and
   the processing unit identifies a closest point to the user and the control unit positions the robot at the closest point on or near a periphery of a safe space indicating an allowed extent of the user motion before the user is likely to encounter a hazard within the real environment.

2. The system according to claim 1, wherein one or more of the barrier elements are rotatable.

3. The system according to claim 1, wherein one or more of the barrier elements comprise one or more different surfaces that may be selectively presented to the user.

4. The system according to claim 1, comprising one or more cameras operable to capture images of the real environment.

5. The system according to claim 1, wherein one or more boundaries correspond to locations of objects in the real environment.

6. The system according to claim 1, wherein the processing unit identifies a closest boundary to the user and the control unit positions the robot between the user and the closest boundary.

7. The system according to claim 1, wherein the processing unit identifies a boundary that the user is moving towards and the control unit positions the robot between the user and the boundary that the user is moving towards.

8. The system according to claim 1, wherein one or more boundaries correspond to a perimeter of a predefined region of the real environment.

9. The system according to claim 1, wherein the processing unit determines a height of the user and a configuration of one or more barrier elements is determined by the processing unit in dependence upon the height.

10. The system according to claim 1, wherein the robot is operable by one or more of the processing unit and the control unit to generate a warning of imminent contact between the user and one or more of the barrier elements.

11. The system according to claim 1, wherein the robot and/or one or more of the barrier elements comprise inflatable and/or folding elements.

12. The system according to claim 1, wherein the processing unit identifies a location of an object or surface with which the user is most likely to interact within a virtual environment and the control unit pre-emptively positions the robot at the location.

13. A method for restricting motion, of a user, using a robot comprising one or more barrier elements, the method comprising:
identifying one or more boundaries in a real environment, the or each boundary corresponding to a predetermined extent of allowed motion in that environment; and
controlling the robot such that at least one barrier element is arranged at a position corresponding to one of the identified boundaries; wherein:
the robot is operable by one or more of the identifying and the controlling to position itself or a barrier element to act as a safety barrier, and
wherein the identifying includes identifying a closest point to the user and the controlling further includes positioning the robot at the closest point on or near a periphery of a safe space indicating an allowed extent of the user motion before the user is likely to encounter a hazard within the real environment.

14. A non-transitory machine-readable storage medium which stores computer software, which when executed by a computer system, causes the computer system to carry out actions for restricting motion, of a user, using a robot comprising one or more barrier elements, the actions comprising:
identifying one or more boundaries in a real environment, the or each boundary corresponding to a predetermined extent of allowed motion in that environment; and
controlling the robot such that at least one barrier element is arranged at a position corresponding to one of the identified boundaries; wherein:
the robot is operable by one or more of the identifying and the controlling to position itself or a barrier element to act as a safety barrier, and
wherein the identifying includes identifying a closest point to the user and the controlling further includes positioning the robot at the closest point on or near a periphery of a safe space indicating an allowed extent of the user motion before the user is likely to encounter a hazard within the real environment.

\* \* \* \* \*